(12) United States Patent
Quest

(10) Patent No.: US 10,571,042 B2
(45) Date of Patent: Feb. 25, 2020

(54) PRESSURIZED FLUID DISPENSING VALVE AND DEVICE

(71) Applicant: TSI Products, Inc., Arlington, TX (US)

(72) Inventor: Michael E. Quest, Arden, NC (US)

(73) Assignee: TSI Products, Inc., Arlington, TX (US)

( * ) Notice: Subject to any disclaimer, the term of this patent is extended or adjusted under 35 U.S.C. 154(b) by 12 days.

(21) Appl. No.: 16/055,897

(22) Filed: Aug. 6, 2018

(65) Prior Publication Data

US 2019/0040974 A1 Feb. 7, 2019

Related U.S. Application Data

(60) Provisional application No. 62/541,455, filed on Aug. 4, 2017.

(51) Int. Cl.
*F16K 35/02* (2006.01)
*F16K 1/12* (2006.01)
*F16K 31/528* (2006.01)
*F16K 31/60* (2006.01)

(52) U.S. Cl.
CPC .............. *F16K 35/027* (2013.01); *F16K 1/12* (2013.01); *F16K 31/528* (2013.01); *F16K 31/60* (2013.01)

(58) Field of Classification Search
CPC .......... F16K 31/60; F16K 35/027; F16K 1/12; F16K 31/528
USPC ....... 251/102, 105, 104; 222/153.15, 153.01, 222/402.11
See application file for complete search history.

(56) References Cited

U.S. PATENT DOCUMENTS

| 1,787,488 | A | * | 1/1931 | McSpedon, Jr. | ........ F16K 35/02 137/382 |
| 2,829,538 | A | * | 4/1958 | Mueller | ................. G05G 1/082 74/548 |
| 4,773,567 | A | * | 9/1988 | Stoody | ................. B05B 11/3059 222/153.11 |
| 4,889,262 | A | * | 12/1989 | Toms | ................... B05B 11/3059 222/153.13 |
| 5,000,347 | A | * | 3/1991 | Tran | ..................... B05B 11/3059 222/1 |
| 5,513,831 | A | * | 5/1996 | Seward | ................. F16K 35/027 192/95 |
| 7,874,461 | B2 | * | 1/2011 | Bae | ..................... B05B 11/0032 222/153.13 |

(Continued)

*Primary Examiner* — Umashankar Venkatesan
(74) *Attorney, Agent, or Firm* — William G. Heedy; The Van Winkle Law Firm

(57) ABSTRACT

A self-sealing valve device includes a main body defining a cavity; an actuating control; a valve body in connection with a plunger in the cavity of the main body; an elongate protrusion extending from the valve body; a collar forming a channel sized for friction fit receipt of the valve body, and wherein the lower end of the collar defines a perimeter zone including first and second capture regions; the valve body being rotatably movable by twisting the actuating control such that the elongate protrusion may be selectively positioned in one of the first and second capture regions; and wherein the first capture region defines a locked configuration wherein the actuating control cannot actuate the flow of the stored fluid and the second capture region defines an unlocked configuration wherein the actuating control may be selectively operated to actuate the flow of the stored fluid.

14 Claims, 5 Drawing Sheets

(56) References Cited

U.S. PATENT DOCUMENTS

| | | | |
|---|---|---|---|
| 8,550,426 B2* | 10/2013 | Johnson | B60T 15/041 |
| | | | 251/101 |
| 2006/0000998 A1* | 1/2006 | Liao | B25F 5/00 |
| | | | 251/323 |

* cited by examiner

PRESSURIZED FLUID DISPENSING VALVE AND DEVICE

RELATED APPLICATION

This application claims the benefit of U.S. Provisional Patent Application Ser. No. 62/541,455 filed on Aug. 4, 2017.

FIELD OF THE INVENTION

This invention relates to pressurized fluid dispensers and, more particularly, an automotive refrigerant dispenser valve and device.

BACKGROUND OF THE INVENTION

For more than twenty years, small cans of 134a automotive refrigerant have contained an EPA required ¾-inch Acme right-hand threaded sealed valve. California Air Resources Board recently required a self-sealing valve for California small cans in 2018. Starting Jan. 1, 2018, the EPA has mandated that all small cans of 134a automotive refrigerant be packaged with a ¾-inch Acme self-sealing valve.

In view of the above, there exists a need for an economical dispensing device adapted for use in combination with the newly mandated ¾-inch Acme self-sealing valves.

SUMMARY OF THE INVENTION

In accordance with one form of the present invention, there is provided a self-sealing valve device for controlled release of a stored fluid within a pressurized fluid dispensing canister including a main body including an inner surface defining a cavity; an output nozzle surrounding an interior surface in fluid flow communication with the cavity of the main body; an actuating control; a valve body in connection with a plunger in the cavity of the main body, the valve body and the plunger being operable using the actuating control; an elongate protrusion extending from an outer facing surface of the valve body; a collar at least partially surrounding the valve body, the collar forming a channel that is sized and configured for friction fit receipt of the valve body, the collar extending between an upper end and a lower end, and wherein the lower end defines a perimeter zone including a first capture region and a second capture region; the valve body being rotatably movable by twisting the actuating control such that the elongate protrusion may be selectively positioned in one of the first and second capture regions; and wherein the first capture region defines a locked configuration wherein the actuating control cannot be operated to actuate the flow of the stored fluid and the second capture region defines an unlocked configuration wherein the actuating control may be selectively operated to actuate the flow of the stored fluid.

In accordance with another form of the invention, there is provided a self-sealing valve device for controlled release of a stored fluid within a pressurized fluid dispensing canister including a main body including an inner surface defining a cavity; a female threaded valve attachment member for releasably securing the self-sealing valve device to the pressurized fluid dispensing canister; an actuating control; a valve body in connection with a plunger in the cavity of the main body, the valve body and the plunger being operable using the actuating control; an elongate protrusion extending from an outer facing surface of the valve body; a collar at least partially surrounding the valve body, the collar forming a channel that is sized and configured for friction fit receipt of the valve body, the collar extending between an upper end and a lower end, and wherein the lower end defines a perimeter zone including a first capture region and a second capture region; the valve body being rotatably movable by twisting the actuating control such that the elongate protrusion may be selectively positioned in one of the first and second capture regions; wherein the first capture region defines a locked configuration wherein the actuating control cannot be operated to actuate the flow of the stored fluid and the second capture region defines an unlocked configuration wherein the actuating control may be selectively operated to actuate the flow of the stored fluid; and a detent on the perimeter zone located between the first capture region and the second capture region, the detent being sized and configured for temporarily obstructing rotational movement of the button as the elongate protrusion is operated between the locked configuration and the unlocked configuration.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 1:
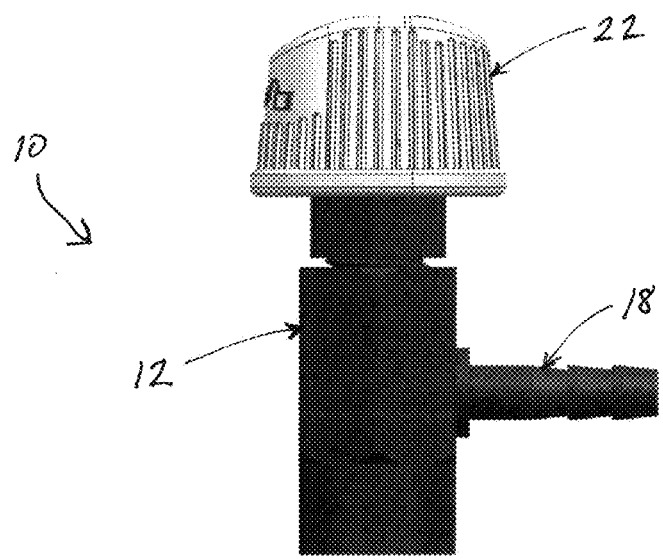
FIG. 1 is a side elevational view of the self-sealing valve device of the present invention.

Referring to the several views of the drawings, the self-sealing valve device is shown and generally indicated as 10. The self-sealing valve device 10 is provided for controlled release of a stored fluid within a pressurized fluid dispensing canister (not pictured). Generally, self-sealing valve device permits a first twisting movement of the actuator to unlock the device and then a subsequent pushing movement depresses the container's self-sealing valve to release refrigerant into the air conditioner. Moreover, a locking detent feature is provided for preventing inadvertent twisting between the locked and unlock positions.

Referring initially to FIGS. 1-10, the self-sealing valve device 10 for controlled release of a stored fluid within a pressurized fluid dispensing canister includes a main body 12 including an inner surface 14 defining a cavity 16. An output nozzle 18 on the main body 12 surrounds an interior surface 20 in fluid flow communication with the cavity 16 of the main body. An actuating control 22, such as a button, is provided for operating the self-sealing valve device 10.

Figure 2:
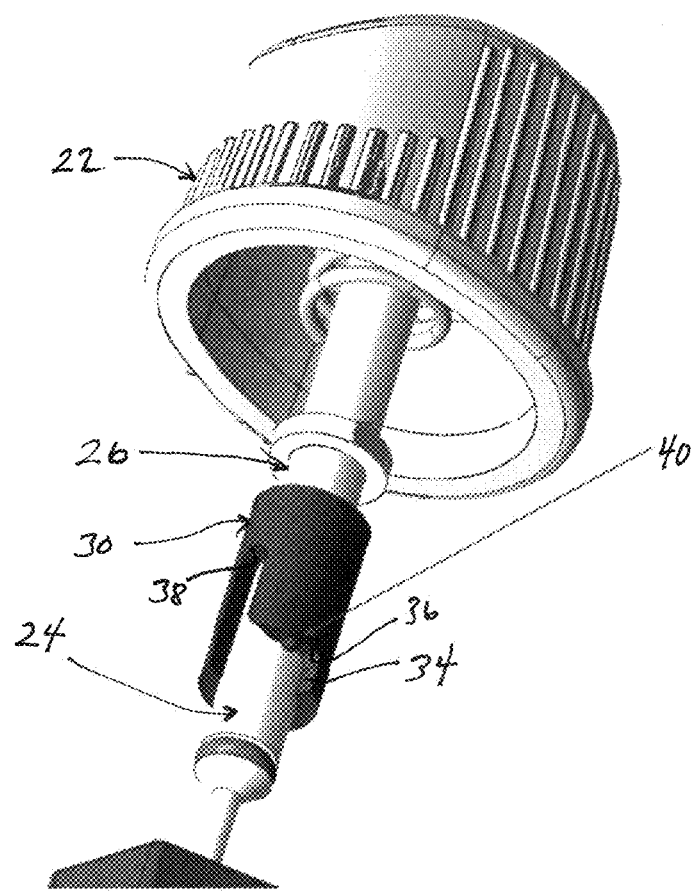
FIG. 2 is an isolated perspective view of the valve body and collar of the self-sealing valve device of the present invention.
Figure 3:
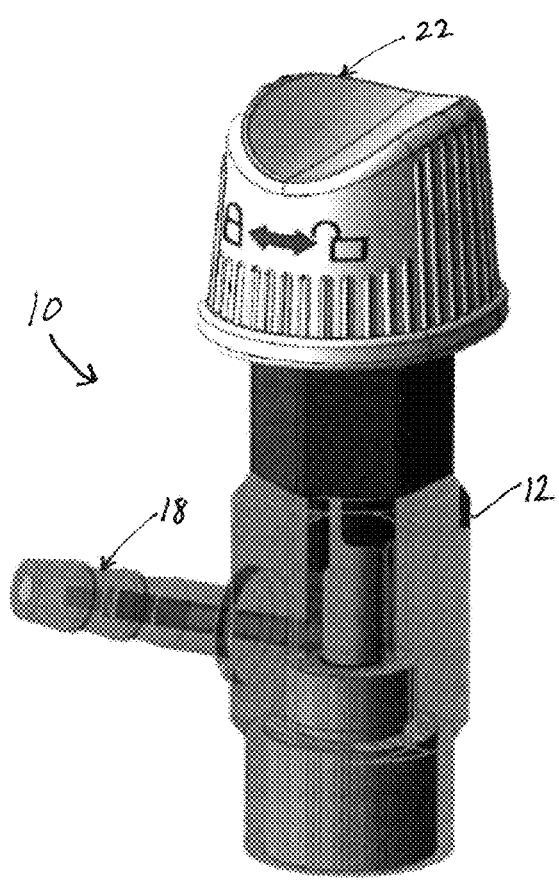
FIG. 3 is a perspective view of the self-sealing valve device of the present invention.
Figure 4:
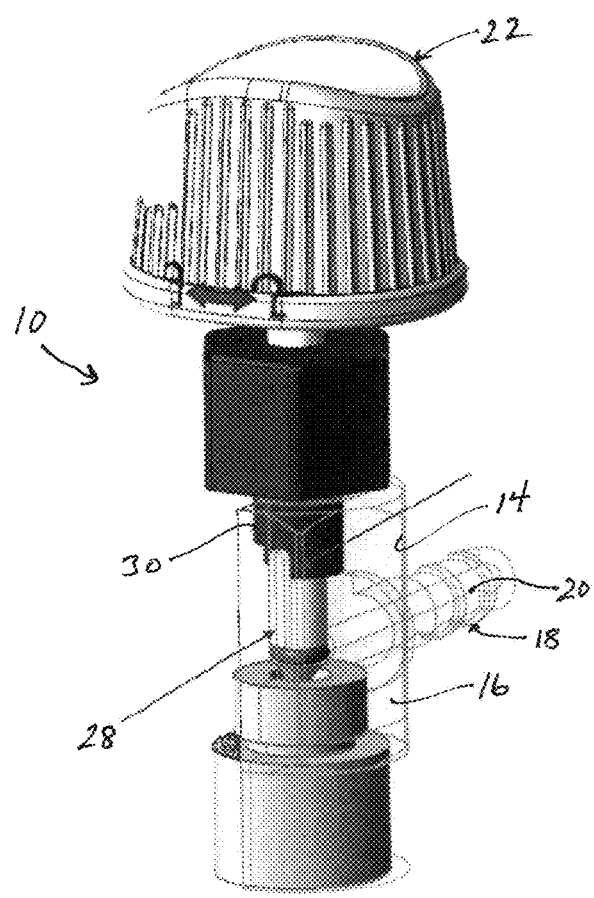
FIG. 4 is a perspective view of the self-sealing valve device of the present invention.
Figure 5:
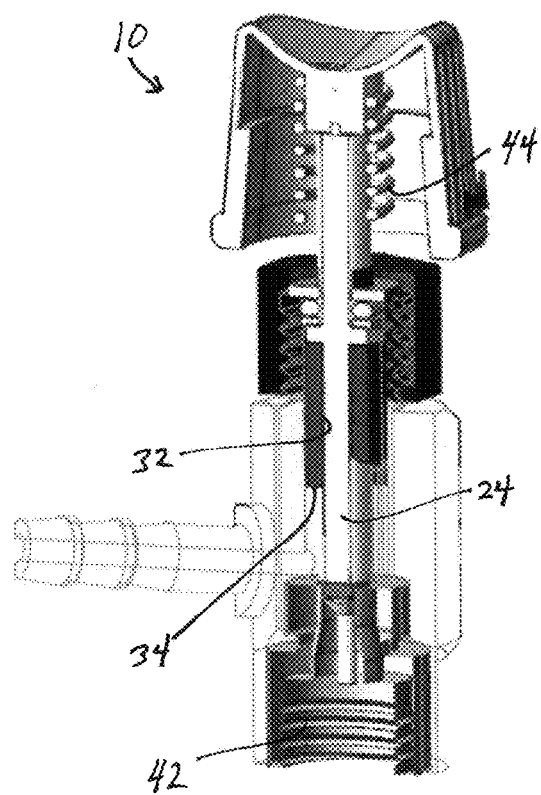
FIG. 5 is a perspective view, shown in cross section, of the self-sealing valve device of the present invention.
Figure 6:
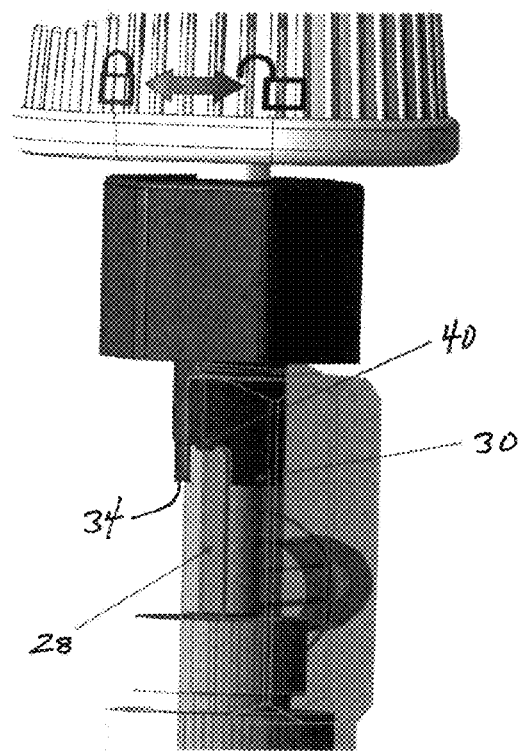
FIG. 6 is a perspective view of the self-sealing valve device of the present invention.

Referring specifically to FIG. 2, a valve body 24 in connection with a plunger 26 is located in the cavity 16 of the main body 12. The valve body 24 and the plunger 26 are operable using the actuating control 22.

Referring now to FIGS. 3-6, an elongate protrusion 28 extends from an outer facing surface of the valve body 24. It is preferable that the elongate protrusion 28 be integrally molded as part of the valve body 24. A collar 30 at least partially surrounds the valve body 24, the collar 30 surrounding a channel 32 that is sized and configured for friction fit receipt of the valve body 24, the collar 30 extending between an upper end and a lower end, and wherein the lower end defines a perimeter zone 34 including a first capture region 36 and a second capture region 38. The valve body 24 is rotatably movable by twisting the actuating control 22 such that the elongate protrusion 28 may be selectively positioned in one of the first and second capture regions 36 and 38. The first capture region 36 defines a locked configuration, as illustrated in FIGS. 3-6, wherein the actuating control 22 cannot be operated to actuate the flow of the stored fluid because sufficient downward movement of the valve body 24 and elongate protrusion 28 is prevented by the path of the first capture region 36.

Figures 7, 8:
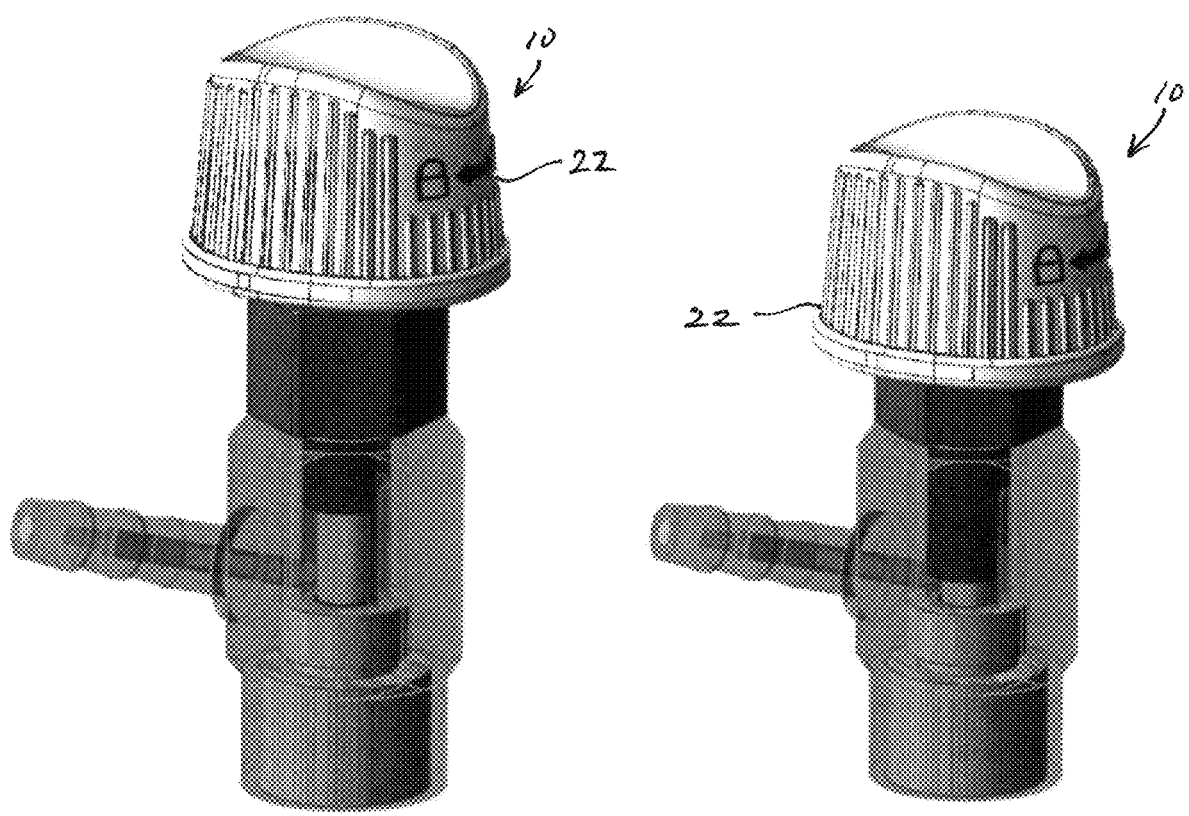
FIG. 7 is a perspective view of the self-sealing valve device of the present invention.
FIG. 8 is a perspective view of the self-sealing valve device of the present invention.
Figure 9:
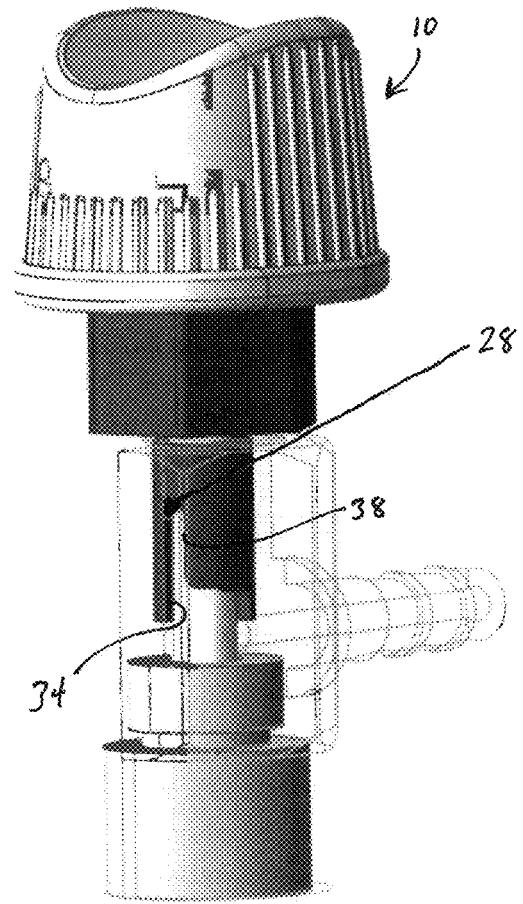
FIG. 9 is a perspective view of the self-sealing valve device of the present invention.
Figure 10:
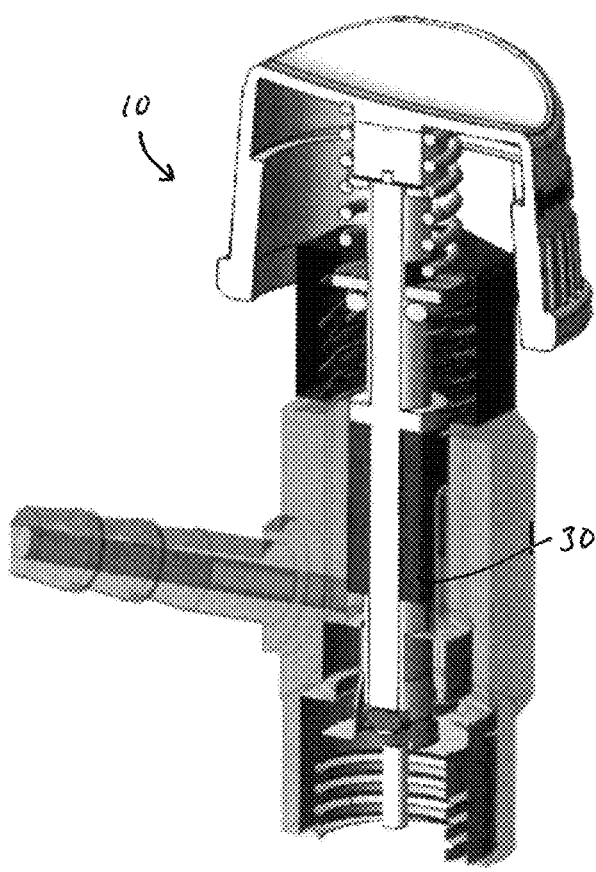
FIG. 10 is a perspective view, shown in cross section, of the self-sealing valve device of the present invention.

Referring now to FIGS. 7-10, the second capture region 38 defines an unlocked configuration wherein the actuating control 22 may be selectively operated to actuate the flow of the stored fluid as sufficient downward movement of the valve body 24 and elongate protrusion 28 is permitted by the path of the second capture region 38. FIG. 7 specifically illustrates the unlocked configuration prior to the actuating control 22 being depressed. FIG. 8 illustrates the unlocked configuration when the actuating control 22 is depressed.

As shown throughout the drawings, a detent 40 is located on the perimeter zone 34 located between the first capture region 36 and the second capture region 38. The detent 40 is sized and configured for temporarily obstructing rotational movement of the actuating control 22 as the elongate protrusion 28 is selectively operated between the locked configuration and the unlocked configuration by the user. This feature serves to prevent inadvertent twisting between the locked and unlock configurations while also notifying the user when he or she has successfully operated the device between the locked and unlock configurations.

The self-sealing valve device 10 may further include a female threaded valve attachment member 42 for releasably securing the self-sealing valve device 10 to the pressurized fluid dispensing canister. The female threaded valve attachment member 42 may include ¾-inch Acme right-hand threads or ¾-inch Acme left-hand threads. Other thread configurations have been considered and may be utilized when desired.

The self-sealing valve device 10 may include a spring 44 that is structured and disposed for providing resistance when the actuating control 22 (in this case, a button) is depressed by the user for downwardly displacing the plunger 26 for actuating the flow of the stored fluid in the canister.

While the present invention has been shown and described in accordance with several preferred and practical embodiments, it is recognized that departures from the instant disclosure are contemplated within the spirit and scope of the present invention.

What is claimed is:

1. A self-sealing valve device for controlled release of a stored fluid within a pressurized fluid dispensing canister, the self-sealing valve device comprising:
   a main body including an inner surface defining a cavity;
   an output nozzle surrounding an interior surface in fluid flow communication with the cavity of the main body;
   an actuating control;
   a valve body in connection with a plunger in the cavity of the main body, the valve body and the plunger being operable using the actuating control;
   an elongate protrusion extending from an outer facing surface of the valve body;
   a collar at least partially surrounding the valve body, the collar forming a channel that is sized and configured for friction fit receipt of the valve body, the collar extending between an upper end and a lower end, and wherein the lower end defines a perimeter zone including a first capture region and a second capture region;
   the valve body being rotatably movable by twisting the actuating control such that the elongate protrusion may be selectively positioned in one of the first and second capture regions; and
   wherein the first capture region defines a locked configuration wherein the actuating control cannot be operated to actuate the flow of the stored fluid and the second capture region defines an unlocked configuration wherein the actuating control may be selectively operated to actuate the flow of the stored fluid.

2. The self-sealing valve device as recited in claim 1 wherein the perimeter zone further comprises a detent between the first capture region and the second capture region, the detent being sized and configured for temporarily obstructing rotational movement of the actuating control as the elongate protrusion is operated between the locked configuration and the unlocked configuration.

3. The self-sealing valve device as recited in claim 1 further comprising a female threaded valve attachment member for releasably securing the self-sealing valve device to the pressurized fluid dispensing canister.

4. The self-sealing valve device as recited in claim 3 wherein the female threaded valve attachment member includes ¾-inch Acme right-hand threads.

5. The self-sealing valve device as recited in claim 3 wherein the female threaded valve attachment member includes ¾-inch Acme left-hand threads.

6. The self-sealing valve device as recited in claim 1 wherein the first capture region is shorter than the second capture region.

7. The self-sealing valve device as recited in claim 1 further comprising a spring that is structured and disposed for providing resistance when the actuating control is depressed by the user for downwardly displacing the plunger for actuating the flow of the stored fluid.

8. The self-sealing valve device as recited in claim 1 wherein said elongate protrusion is integrally molded as part of the valve body.

9. A self-sealing valve device for controlled release of a stored fluid within a pressurized fluid dispensing canister, the self-sealing valve device comprising:
   a main body including an inner surface defining a cavity;
   a female threaded valve attachment member for releasably securing the self-sealing valve device to the pressurized fluid dispensing canister;
   an actuating control;
   a valve body in connection with a plunger in the cavity of the main body, the valve body and the plunger being operable using the actuating control;

an elongate protrusion extending from an outer facing surface of the valve body;

a collar at least partially surrounding the valve body, the collar forming a channel that is sized and configured for friction fit receipt of the valve body, the collar extending between an upper end and a lower end, and wherein the lower end defines a perimeter zone including a first capture region and a second capture region;

the valve body being rotatably movable by twisting the actuating control such that the elongate protrusion may be selectively positioned in one of the first and second capture regions;

wherein the first capture region defines a locked configuration wherein the actuating control cannot be operated to actuate the flow of the stored fluid and the second capture region defines an unlocked configuration wherein the actuating control may be selectively operated to actuate the flow of the stored fluid; and a detent on the perimeter zone located between the first capture region and the second capture region, the detent being sized and configured for temporarily obstructing rotational movement of the actuating control as the elongate protrusion is operated between the locked configuration and the unlocked configuration.

10. The self-sealing valve device as recited in claim 9 wherein the female threaded valve attachment member includes ¾-inch Acme right-hand threads.

11. The self-sealing valve device as recited in claim 9 wherein the female threaded valve attachment member includes ¾-inch Acme left-hand threads.

12. The self-sealing valve device as recited in claim 9 wherein the first capture region is shorter than the second capture region.

13. The self-sealing valve device as recited in claim 9 further comprising a spring that is structured and disposed for providing resistance when the actuating control is depressed by the user for downwardly displacing the plunger for actuating the flow of the stored fluid.

14. The self-sealing valve device as recited in claim 9 wherein said elongate protrusion is integrally molded as part of the valve body.

* * * * *